(12) United States Patent
Anttila et al.

(10) Patent No.: US 7,124,953 B2
(45) Date of Patent: Oct. 24, 2006

(54) VISUAL ENCODING OF A CONTENT ADDRESS TO FACILITATE DATA TRANSFER IN DIGITAL DEVICES

(75) Inventors: Akseli Anttila, Helsinki (FI); Oleg Beletski, Helsinki (FI); Ingrid Schembri, Helsinki (FI); Petteri J. Saarinen, Helsinki (FI); Jukka Heinonen, Helsinki (FI); Tony Niklas von Knorring, Helsinki (FI); Hartti Suomela, Espoo (FI)

(73) Assignee: Nokia Corporation, Espoo (FI)

( * ) Notice: Subject to any disclaimer, the term of this patent is extended or adjusted under 35 U.S.C. 154(b) by 209 days.

(21) Appl. No.: 10/747,532

(22) Filed: Dec. 29, 2003

(65) Prior Publication Data

US 2005/0139680 A1  Jun. 30, 2005

(51) Int. Cl.
*G06K 7/10* (2006.01)
(52) U.S. Cl. .................... 235/472.02; 235/472.01; 235/472.03; 235/462.45; 235/462.46
(58) Field of Classification Search ............ 235/462.45, 235/462.46, 472.01, 472.02, 472.03
See application file for complete search history.

(56) References Cited

U.S. PATENT DOCUMENTS

| 5,870,716 | A | 2/1999 | Sugiyama et al. | |
|---|---|---|---|---|
| 5,938,727 | A | 8/1999 | Ikeda | |
| 6,308,084 | B1 | 10/2001 | Lonka | |
| 2002/0163579 | A1 | 11/2002 | Patel et al. | |
| 2003/0121981 | A1* | 7/2003 | Slutsky et al. | 235/462.45 |
| 2004/0118923 | A1* | 6/2004 | Creamer et al. | 235/462.01 |
| 2005/0161511 | A1* | 7/2005 | Parker et al. | 235/472.01 |

FOREIGN PATENT DOCUMENTS

| DE | 100 05 486 | 8/2001 |
|---|---|---|
| DE | 101 04 409 | 8/2002 |
| EP | 1 128 597 | 8/2001 |
| EP | 1 355 258 A2 | 10/2003 |
| EP | 1 359 739 A2 | 11/2003 |
| JP | 2003169187 | 6/2003 |
| WO | WO 98/38761 | 9/1998 |
| WO | WO 02/09362 | 1/2002 |
| WO | WO 03/067441 | 8/2003 |

OTHER PUBLICATIONS

Distributing Uniform Resource Locators as Bar Code Images; IBM Technical Bulletin; Jan. 1996; vol. 39, No. 01.
Mark Hahn; Uniform Resource Locators; Dec. 1995; pp. 8-13.

* cited by examiner

*Primary Examiner*—Karl D. Frech
(74) *Attorney, Agent, or Firm*—Alston & Bird LLP

(57) ABSTRACT

The invention is defined by systems, methods and applications for establishing a short-range communication link between digital devices for the purpose of transferring data between the devices. The first device generates and displays a visual code that encodes the address of the first device and the location of data element desired to be transferred. A second device, which implements image capture capability, captures the visual code and decodes such to determine the address of the first device and the location of the data element. Upon decoding, the second device will automatically initiate the short-range communication link between the first and second digital devices and the transfer of the data element from the first device to the second device will ensue.

37 Claims, 2 Drawing Sheets

VISUAL ENCODING OF A CONTENT ADDRESS TO FACILITATE DATA TRANSFER IN DIGITAL DEVICES

FIELD OF THE INVENTION

The present invention relates to establishing communication amongst digital devices and, more specifically, to systems, terminals, computer program products and methods for using visual encoding to facilitate short-range data transfer between digital devices.

BACKGROUND OF THE INVENTION

The rapid growth of digital communication has made it possible for all kinds of digital data elements to be communicated amongst various types of wireless and wire line communication devices. For instance, the cellular or mobile telephone is no longer limited to telephonic voice communication and may include other means of digital communication, such as digital networking (i.e., Internet communication, text messaging, and the like). In addition, an increasing number of cellular telephones and other mobile wireless communication devices, such as portable computers, personal digital assistants (PDAs) and the like, are being integrated with other means of capturing or producing digital media, such as digital cameras, digital audio recorders, digital video recorders and the like. Technological advances have made it possible for other digital devices, such as digital cameras, digital video recorders, digital audio devices and the like to be equipped with means for digital communication. As more and more digital devices possess the capability to digitally communicate with one another, the amount of digital data elements that will be communicated amongst these devices will increase at an alarming rate. Included amongst the category of data elements are all forms of data, such as text files, audio files, image files, executable applications in the form of software or video games and the like.

Wireless digital communication and, in particular short-range wireless communication, has recently experienced a growth due to the onset of new technologies, such as Bluetooth®, Wi-Fi (also known as 802.11) and other wireless local area networks (WLANs). These new technologies have provided an alternative in wireless networking over the previous fixed long-range microwave transmitter based delivery of network connections.

Bluetooth® is a wireless specification delivering short-range radio communication between electronic devices that are equipped with specialized Bluetooth-enabled semiconductor chips. It lets nearly all devices talk to one another by creating a common language between them. All electronic device such as cellular phones, personal digital assistants (PDAs), pagers, and any other device equipped with the Bluetooth-enabled chip can communicate and connect using Bluetooth® technology to form a private, personal area network (PAN). The devices carrying Bluetooth-enabled chips can easily transfer data at a rate of about 720 Kbps (kilobits per second) within 10 meters (33 feet) of range through walls, clothing and other objects. The interaction between devices occurs by itself without direct human intervention whenever they are within each other's range. In this process, the software technology embedded in the Bluetooth® transceiver chip, referred to as link controller, triggers an automatic connection to deliver and accept the data flow.

Whenever devices carrying Bluetooth® technology are within each other's range, they may create an automatic ad hoc PAN (personal area network) called a piconet. In this arrangement, one device acts as the "master", while other devices function as "slaves". A piconet normally carries up to eight devices. The master device decides if a particular communication service is needed from a slave device. At the time when a connection is made between Bluetooth® devices, an exchange of unique Bluetooth identity called global ID takes place. A device global ID indicates its profile along with capability functions. Upon matching of the device profile a connection is made and as the devices exchange data, the Bluetooth® transceiver chip hops back and forth among frequencies.

Bluetooth's key features are robustness, low complexity, low power and low cost. Designed to operate in noisy frequency environments, the Bluetooth-enabled devices use a fast acknowledgement and frequency-hopping scheme to make the link robust. Because Bluetooth-enabled devices operate in the unlicensed ISM band at 2.4 GHz, they avoid interference from other signals by hopping to a new frequency after transmitting or receiving a packet.

Wi-Fi (wireless fidelity) is used to describe products that follow the 802.11 set of standards developed by the Institute of Electrical and Electronic Engineers (IEEE). The most popular of these is 802.11b, which operates in the 2.4 GHz band and transfers data at 11 megabits per second (Mbps). The emerging 802.11a standard operates in the 5 GHz band and can transfer data up to 54 Mbps. These technologies have a range of about 300 feet. Wi-Fi enabled devices can send and receive data wirelessly from any location equipped with Wi-Fi access. Wi-Fi access is provided through access points, installed within a Wi-Fi location, that transmit an RF signal to Wi-Fi enabled devices that are within range of the access point, which is about 300 feet. The speed of the transmission is governed by the speed of the pipeline fed into the access point.

These advanced wireless communication mediums make it possible for digital communication devices to communicate and transfer information between devices within the wireless local area network (WLAN). However, typically for devices to be included within a WLAN and/or to communicate using a short-range communication medium such as Bluetooth®, Wi-Fi, Radio Frequency Identification (RFID) or the like the devices need to discover one another and need to exchange information in order to establish the communication link. In certain technologies, such as Bluetooth®, the discovery process tends to be inefficient and results in time-consuming connection establishment. In addition, even after devices have been discovered, typically the exchange of required communication settings between the devices is conducted manually and requires users to manually input and transmit the communication settings. This type of manual input of data is inefficient and is prone to human error. In addition to manual input of communication settings, the data that is being transferred between the devices will typically be inputted manually, thus, further exacerbate the inefficiency of the data transfer process.

An additional security concern exists in the wireless environment concerning the wireless transmission of codes and settings needed to establish the communication link. Over-the-air transmission of such data is susceptible to being eavesdropped and intercepted by potential hackers. While currently, public key information (PKI) and similar encryption coding of data address the concerns related to exchange of data through untrusted communication medium, it is unknown as to what the future holds in regards to the hackers ability to circumvent these current PKI and similar techniques.

Thus, the need exists to develop a system for establishing short-range communication between digital devices and furthering the transfer of data once the communication link is established. The desired system should obviate the need for manual inputs, thus eliminating human error situations and making for a more efficient means of establishing short-range communication and data transfer. A further need exists to develop a system for establishing short-range communication between digital devices and furthering the transfer of data that is secure and insures that only desired data is transferred and that the transfer is limited to the targeted transfer device.

BRIEF SUMMARY OF THE INVENTION

The present invention provides for systems, applications and methods for establishing a short-range communication link between digital devices for the purpose of transferring data between the devices. The present invention provides for an efficient and reliable means of establishing the short-range communication link, in that, the invention obviates the need to manually input and communicate communication settings between the devices prior to establishing the link. In addition, the encoding of data adds inherent security to the process and further security measures can be implemented in the invention to insure the link is established securely and data is transferred securely.

In summary, the invention operates in the following manner. A first device generates and displays a visual code that encodes the address of the first device and the location of data element desired to be transferred. A second device, which implements image capture capability, captures the visual code and decodes such to determine the address of the first device and the location of the data element. Upon decoding, the second device will automatically initiate the short-range communication link between the first and second digital devices and the transfer of the data element from the first device to the second device will ensue.

In one embodiment of the invention a system for establishing short-range communication between digital devices is defined. The system includes a first digital device having a first data processor, the first digital device being in communication with a display. While in most instances the first digital device will be a mobile, handheld device having an internal display, it is possible for the device to be a conventional, non-mobile device and for the display to be external. The first data processor will execute a visual encoding application and the application will include a computer readable storage medium having computer-readable program instructions embodied in the medium. The instructions will include instructions for generating a visual code displayable on the display and the code will an address of the first device and a storage location of a predetermined data element.

The visual code generated may be chosen from among any conventional visual code, such as two-dimensional (2D) barcode, quick response (QR) code, data glyph, or any kind of proprietary encoding scheme or the like. The encoded address will be dictated by the communication application that is established and may, for example, be a Bluetooth® address, an IP address, a URL or the like. The data element location identifier may, for example, be a URL, a storage location or a file identifier. In addition to the device address and the location identifier of the data element, the visual code may encode other relevant information including, but not limited to, the communication application that is to be established, the type of transfer that is to occur, security measures and the like.

The system will additionally include a second digital device having a second data processor and being in communication with an image capture device that captures the visual code from the display. While in most instances the second digital device will be a mobile, handheld device having an internal image capture device, it is possible for the device to be a conventional, non-mobile device and for the image capture device to be external. The second data processor will execute a visual decoding application that includes a computer readable storage medium having computer-readable program instructions embodied in the medium. The computer-readable program instructions include instructions for decoding the captured visual code. In addition, the computer-readable instructions may include instructions for automatically initiating a predetermined communication application upon decoding the visual code.

The invention is also embodied in a computer program product for establishing short-range communication between digital devices. The computer program product includes a computer readable storage medium having computer-readable program instructions embodied in the medium. The computer-readable program instructions include first instructions, implemented on a first digital device, for generating and displaying a visual code that encodes an address of the first digital device and a predetermined data element location identifier. The computer-readable program instructions also include second instructions, implemented on a second digital device, for capturing and decoding the visual code and initiating a short-range communication link between the second digital device and the first digital device for the purpose of transferring the data element from the first digital device to the second digital device.

Additionally, the invention may be defined in a method for establishing short-range communication between digital devices. The method includes the steps of identifying a data element that is associated with a first digital device. The identified data element being a data element, such as a file or an application that requires transfer to a second digital device. Once the data element is identified, the method encodes, in the form of a visual code, an address of the first digital device and a location identifier of the data element. Once the encoding process has generated the visual code it is displayed on a display that is in communication with the first digital device.

The method continues by capturing the visual code with an image capture device that is communication with the second digital device. Once the visual code is captured, decoding of the visual code ensues at the second digital device to determine the location identifier of the data element and the address of the first device. The method may additionally include the steps of initiating, automatically, a short-range communication link between the second digital device and the first digital device, upon decoding the visual code and transferring the data element from the first digital device to the second digital device. The method may also include security measures such as confirming, at the first digital device, the authorization of the second digital device, once the short-range communication link has been established.

As such, the present invention provides for an efficient and reliable means of establishing the short-range communication link, in that, the invention obviates the need to manually input and communicate communication settings between the devices prior to establishing the link. In addition, the encoding of data adds inherent security to the process and further security measures can be implemented in the invention to insure the link is established securely and data is transferred securely.

BRIEF DESCRIPTION OF THE DRAWINGS

Figure 1:
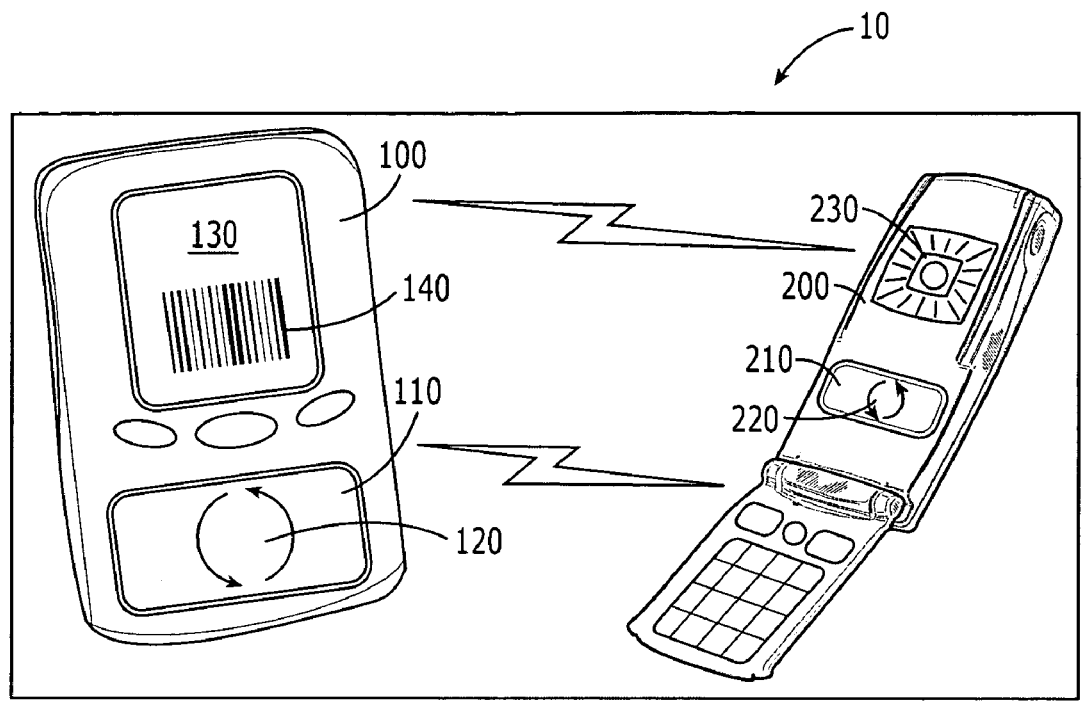

Having thus described the invention in general terms, reference will now be made to the accompanying drawings, which are not necessarily drawn to scale, and wherein:

FIG. 1 is a block diagram of a system for establishing a short-range communication link between digital devices, in accordance with an embodiment of the present invention.

Figure 2:
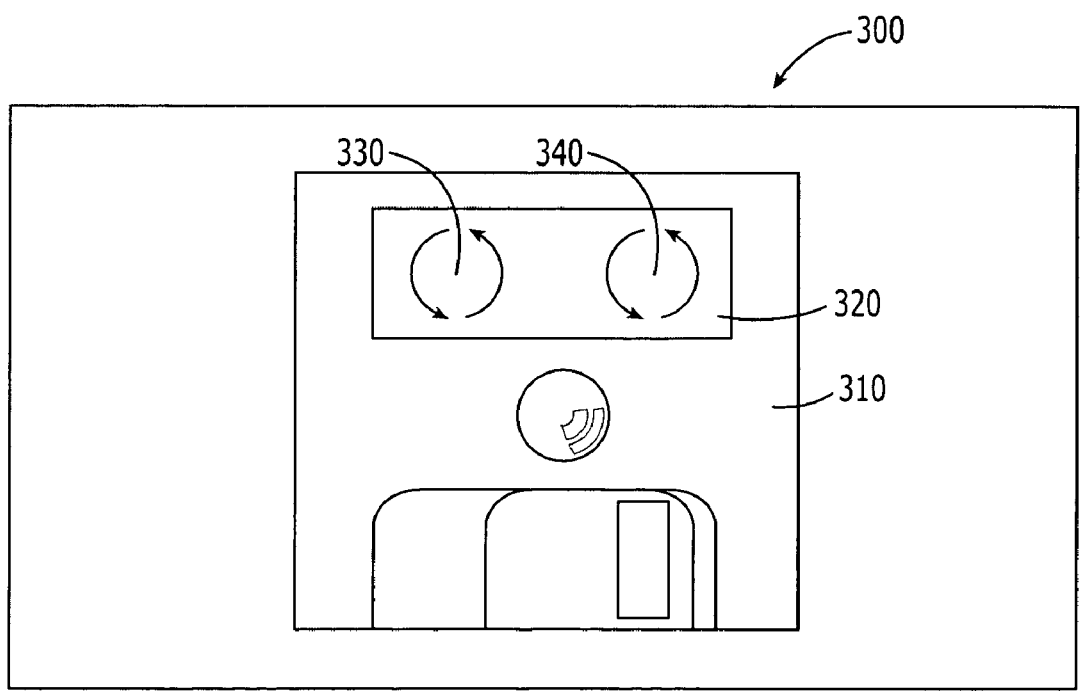

FIG. 2 is a block diagram of an application for establishing a short-range communication link between digital devices, in accordance with an embodiment of the present invention.

Figure 3:
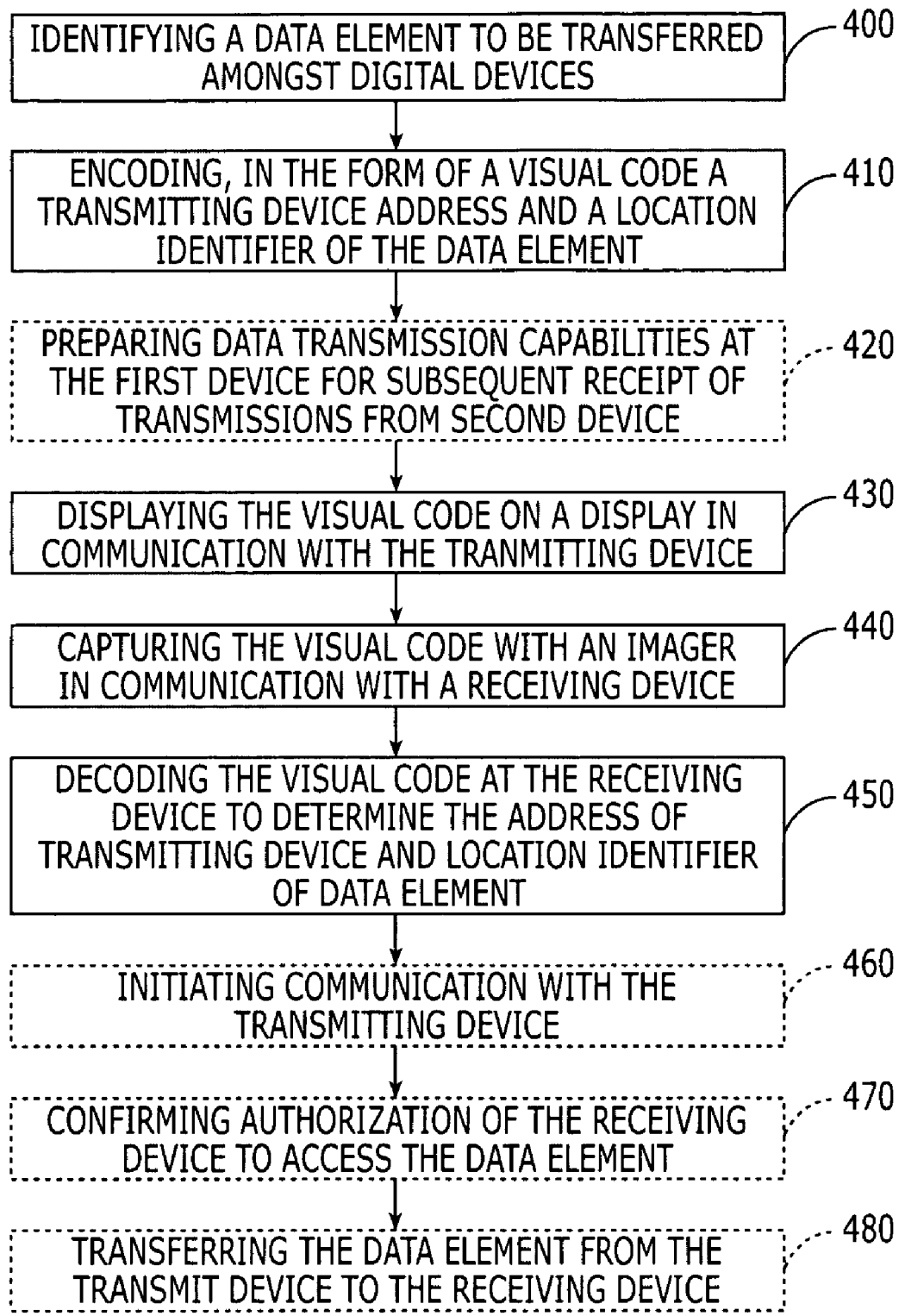

FIG. 3 is a flow diagram of a method for establishing a short-range communication link between digital devices, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for a system, a computer program product and a method for establishing short-range communication and furthering data transfer between digital devices, typically mobile devices, such as handheld computers, personal digital assistants (PDAs), cellular or mobile telephones and the like. The application and system provide for the transmitting device to visually encode data related to the transmitting device and the storage location within the transmitting device of the data object requiring transmission/transfer. The transmitting device will display the visual code to the receiving device, which is equipped or in communication with an image capture device, such as a digital camera. Upon capturing the visual code, the receiving device will decode the visual code to receive the necessary information for establishing the short-range communication link between the devices and to expedite the transfer of information from the transmitting device to the receiving device.

FIG. 1 is a block diagram of a system for establishing short-range communication and further data transfer in digital devices, in accordance with an embodiment of the present invention. The system 10 includes a first digital device 100 in communication with a first data processor 110 that executes a visual encoding application 120. The first device will either include or be in communication with a display 130 that provides the capability to display a visual code 140 resulting from execution of the visual encoding application. The system also includes a second device 200 that is in communication with a second data processor 210 that executes a visual decoding application 220. The second device will either include or be in communication with an image capture device 230 that provides the capability to capture the visual code displayed by the first device and communicate the images to the visual decoding application.

The first digital device 100 will typically be a mobile terminal capable of short-range communication. For example, the first device may be a mobile or cellular telephone, a personal digital assistant (PDA) or the like. However, the first device is not required to be a mobile terminal and may include such stationary devices as a personal computer (PC), automated teller machine (ATM), vending machine or kiosk or the like. The short range communication medium may be any form of short range communication including a short range radio network, such as, for example, Bluetooth®, Wireless Local Area Network (WLAN), Radio Frequency Identification (RFID), Infrared Data Association (IrDa), Ultra Wideband (UWB), or the like. According to other embodiments of the invention, the communication may include wireless telecom through cellular network and the Internet.

The visual encoding application 120 executed by the first data processor device 110 will create a visual code 140 for a user-selected data element, such as a file, an application, a URL link or other types of data accessible to the first digital device. At a minimum, the visual code will encode a terminal address of the first digital device and a data identifier for the selected data element. The terminal address is used by the receiving device (i.e., the second digital device) to launch device-to-device communication. For example, the terminal address may be a Bluetooth® device address, an Internet Protocol (IP) address, a Uniform Resource Locator (URL) or the like. The data identifier, which may be the URL for the selected data element, provides the receiving device (i.e., the second digital device) with information pertaining to the storage location of the data element or the file identifier of the data element.

In addition, the visual code 140 may optionally encode other information relevant to the communication medium of the selected data element. For example, the visual code may encode information related to the specific communication application that is required to communicate between the devices, i.e., Bluetooth®, Wi-Fi, RFID or the like. Additionally, the visual code may encode the transfer type, such as moving the data element from the first digital device to the second digital device or copying the data element from the first digital device to the second digital device. The transfer type information may also include limited use authorization for the file to be transferred, such as one-time only use or a purchase option. In a commercial application, in which the first device may offer for sale a data element, such as a video game, a software application, audio file, video file or the like, the visual code may encode a price or transfer fee.

A security means may be encoded into the visual code in the form of password type protection, in which the user of the receiving device (i.e., the second digital device) would be required to enter the encoded password before accessing the information encoded in the visual code. Alternatively, encryption keys may be encoded in the visual code and such keys may be subsequently used in encrypting and decrypting the data sent over the communication link.

The visual code 140 created by the visual encoding application 120 may be any visual code suitable for encoding data. For example, the visual encoding application may be a two-dimensional (2D) barcode/symbology encoding application that creates any of a multitude of 2D barcodes. Additionally, the visual encoding application may create a visual code in the form of quick response (QR) codes, data glyph or a proprietary encoding scheme. In these types of visual codes, the textual, alphanumeric or binary data is encoded into a single visual matrix of dots or into a combination of other shapes, colored or black-and-white and the code makes no distinction between which portions of the resulting coded image contain associated portions of the encoded data string.

It may also be advantageous to provide for a visual code that includes human readable forms as a means of making the function of the code more understandable to the individual reading the code and generally improving the user experience. In this regard, it is noted that conventional 2D barcodes and the like provide the user no insight as to the function of the code. Thus, for example, it may be beneficial to implement a visual code application that generates a code in which predetermined portions contain specific information, such as device address located in one portion of the code and the data element address located in another portion of the code. Additionally, it may be advantageous to implement a visual code application that generates a code that uses colors or shapes to define the type of data element being transferred. For instance, a triangular shape in one corner of the visual code denotes contact information (i.e., a phonebook entry). In this regard, the individual reading the code knows the general content of the information being transferred.

Additionally, colors or code resolution may be varied to create multiple layers of information within the same code. Such layering provides for the code to be compatible with multiple devices, which implement various code reading applications. For example, older legacy devices may be capable of reading and comprehending black and white code while disregarding the colored code, whereas more advanced devices may use the color code to obtain a more complex version of the data entity associated with the code.

Once the visual code 140 is generated by the visual encoding application 120, the code will be displayed, typically on a display 130 that is internal to the first digital device 100 (such as shown in FIG. 1), although in certain embodiments the display may be external to the first digital device. For example, the visual encoding application may be implemented on a personal computer or a server that is in network communication with an external device, such as a PDA, or mobile telephone. Once the application generates the code it may be communicated to the external device and visually displayed on the corresponding display. Alternatively, the generated code may be communicated to an internal or external printer and printed out in hardcopy format.

The second digital device 200 of the system 10 will typically be a mobile terminal capable of short-range communication and in communication with an image capture device 230. For example, the second device may be a digital camera or camcorder, a mobile or cellular telephone equipped with a digital camera, a personal digital assistant (PDA) equipped with a digital camera, an audio player equipped with a digital camera or the like. The short-range communication medium may be any form of short-range communication that is compatible with the short-range communication capabilities of the first digital device 100. While in most embodiments the second digital device will be a mobile type device capable of being handheld for the purpose of facilitating image capture of the displayed visual code, it is also possible for the second digital device to be a stationary device. For example, in a stationary embodiment the second digital device may not internally incorporate an image capture device 230 but, rather, the second digital device may be in communication with an external image capture device.

The visual decoding application 220 executed by the second data processor 210 provides for decoding of the visual code that is captured by the image capture device 230. As such, the visual decoding application must be capable of decoding the same type of visual code that the visual encoding application 120 produces. As previously noted, the visual code may be a two-dimensional (2D) barcode/symbology, quick response (QR) code, data glyph, a proprietary encoding scheme or the like. The image capture device 230 will typically send a continuous stream of data to the decoding application. The decoding application, upon recognition in the image data stream of a shape matching a visual code, will capture the image and decode the data contained in the visual code. Decoding of the visual code will, at a minimum, determine the address of the first digital device and location identifier of the data element that requires transferring.

Once the second digital device has determined, at a minimum, the address of the first digital device, the second digital device will automatically launch the required communication application and initiate the transfer of the data element from the first digital device to the second digital device.

Paramount to the display of visual code by one device and the capturing of the visual code by another device is the need to insure secure access to both the code and data element being transferred. In the embodiments in which the devices are mobile, handheld units, inherent security is possible because the user of the handheld device can control access to the visual code. However, in embodiments in which the digital device is not mobile (i.e., not handheld) the display of the visual code becomes far less personal. In one embodiment of the invention, the security issue is addressed by encoding a password into the visual code. Additionally, the password may be secured by using a hash code that ensures that even in instances in which an outsider "sees" the code, the outsider cannot "open" the coded information without the proper hash. The user of the receiving device (i.e. the second digital device) must enter the password before accessing the encoded data or before the transmitting device (i.e., the first digital device) transfers the data element. As alternatives to passwords, the visual code may include access parameters or encryption keys that are associated with the identity of the second digital device. In another embodiment of the invention, the user of the transmitting device (i.e., the first digital device) will be required to authorize the transfer of the data element (i.e., confirm that the receiving device is the acceptable transferee) prior to transferring the data element.

The invention is also embodied in a computer program product for establishing short-range communication between digital devices. FIG. 2 represents a block diagram of the application, in accordance with an embodiment of the present invention. The computer program product can be used for any two-way communication protocol on any radio frequency, infrared or audio frequency (infrasound, ultrasound or audible frequency range). The computer program product 300 includes a computer readable storage medium 310 having computer-readable program instructions 320 embodied in the medium. The computer-readable program instructions include first instructions 330 for generating and displaying a visual code that encodes a first digital device address and a data element location identifier that identifies the location of the data element requiring transmission.

Additionally, the instructions will include second instructions 340 for capturing and decoding the visual code and initiating a short-range communication link between the second digital device and the first digital device for the purpose of transferring the data element from the first digital device to the second digital device. The first instructions will be implement on a first digital device and the second instructions will be implemented on a second digital device. The computer program product will be executable by a conventional computer operating system, such as Windows® (manufactured by Microsoft Corporation of Redmond, Wash. USA), Palm OS® (manufactured by PalmSource Incorporated of Sunnyvale, Calif. USA), Mac OS® (manufactured by Apple Computers of Cupertino, Calif. USA), Linux or Unix based operating systems or the like.

The invention is additionally defined by a method for establishing short-range communication between digital devices. The method can be used for any two-way communication protocol on any radio frequency, infrared or audio frequency (infrasound, ultrasound or audible frequency range). FIG. 3 is a flow diagram depicting the steps in the method, in accordance with an embodiment of the present invention. At step 400, the method is initiated by identifying a data element that is associated with a first digital device and requires transfer to a second digital device. The data element may be any element stored on the first digital device or any data element that the first digital device has access to. Examples, of data elements include text files, executable applications and the like. Identification of the data element will typically entail implementing the user interface (UI) to select a data element by standard data element selection methods dictated by the UI, such as scrolling down a list of data elements and highlighting a data element that requires transfer to the second digital device.

At step 410, the method continues by encoding a location identifier of the data element and an address of the first device in the form of a visual code. In application, once the data element has been identified, a user will select the requisite encoding command, such as "create visual code" and the encoding process will automatically commence. Encoding will entail a known visual code generation method, such as 2D barcodes, QR-codes, data glyph, proprietary code or the like. At a minimum, the visual code will encode the terminal address of the first device, such as the Bluetooth® device address, an IP address or a Uniform Resource Locator (URL). The terminal address that is encoded will be dictated by the short-range communication medium that will be used to transfer the data element. In addition, the visual code will encode a data element location identifier that notifies the second device of the location of the data element. For example, the data element location identifier may a URL, a memory location or file identifier. As previously discussed the visual code may include additional encoded data, such as requisite communication application, transfer type, security parameters and the like. Additionally, the step of encoding may include encoding password protection into the visual code, which would require the user of the second device to enter the password prior to accessing the data element. The additional encoded information may be preconfigured in the application or the user may be able to choose the necessary encoded data from a menu-type listing of encoding options.

At optional step 420, once the data element has been selected and the visual code created, the first device will typically prepare data transmission capabilities for subsequent receipt of communications from the second digital device. The data transmission capabilities may include, but are not limited to, launching the infrared (IR) receiver and powering up the RF components of the first device. In most instances, the IR receiver will.

At step 430, the visual code is displayed on a display that is in communication with the first device. Displaying of the code will be initiated by the visual encoding application, which requests the screen-rendering programs of the device to display the generated visual code on the device screen. Typically, the display/screen will be internal to the first device; however, it is possible for the display to be external from the first device. In one embodiment of the invention, an additional step is provided whereby the time period for displaying the visual code will correspond to the time period for which access to the data element is allowable. In other words, the second device may only access the data element as long as the visual code is being displayed. This optional step provides for heightened security in insuring that other devices do not capture the visual code. In addition, displaying of the visual code by the first digital device may trigger the start-up of the communication application in the first digital device, as a means of expediting the anticipated transfer of the data element from the first digital device to the second digital device.

At step 440, the visual code is captured by an imager that is in communication with the second digital device. Typically, the imager will be a digital camera that is internal to the second digital device; however, the imager may be any other form of image capturing device and may be external to the second digital device. In most instances, the imager will send a continuous stream of image data to a visual decoding application.

At step 450, decoding of the visual code occurs at the second digital device. Decoding of the visual code will determine the location identifier of the data element and the address of the first device. The decoding application will correspond to the encoding application implemented on the first device, in that; both applications will encode and decode the same form of symbology.

Once the communication link has been established between the devices, optional steps 460, 470 and 480 may ensue. At step 460, the second digital device initiates communication with the first digital device by automatically launching the requisite communication application. At step 470, a confirmation process may occur at the first device, whereby the first device confirms that the second device has been granted authorization to access the data element. At step 480, the data element is transferred from the first device to the second device. Transferring may entail moving the data element from the first device to the second device or it may entail copying the data element from the first device and subsequent communication to the second device. The transfer process may include any necessary hand-shaking procedures and error correction procedures necessary to properly transfer the data element. Once the data is transferred to the second device different determining factors may dictate how and where the data element is to be stored and/or processed in the second digital device. For example, the determination on storing and/or processing may be dictated by encoded data in the visual code, data in the transferred data element or communication application requirements.

As such, the present invention provides for an efficient and reliable means of establishing the short-range communication link, in that, the invention obviates the need to manually input and communicate communication settings between the devices prior to establishing the link. In addition, the encoding of data adds inherent security to the process and further security measures can be implemented in the invention to insure the link is established securely and data is transferred securely.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for establishing short range communication between digital devices, the system including:
   a first digital device having a first data processor, the first digital device being in communication with a display;
   a visual encoding application that is executed by the first data processor and comprises a computer readable storage medium having computer-readable program instructions embodied in the medium, the computer-readable program instructions include instructions for generating a visual code displayable on the display, wherein the visual code encodes an address of the first digital device and a storage location of a predetermined data element within the first digital device;
   a second digital device having a second data processor, the second digital device being in communication with an image capture device that captures the visual code from the display; and
   a visual decoding application that is executed by the second data processor and comprises a computer readable storage medium having computer-readable program instructions embodied in the medium, the computer-readable program instructions include instructions for decoding the captured visual code for establishing a wireless short-range communication link with the first digital device to access the predetermined data element.

2. The system of claim 1, wherein the first digital device is a mobile device capable of being handheld.

3. The system of claim 1, wherein the first digital device has an internal display.

4. The system of claim 1, wherein the visual encoding application includes computer-readable program instructions including instructions for generating a visual code, wherein the type of visual code is chosen from the group consisting of two-dimensional (2D) barcode, quick response (QR) code, data glyph, and proprietary encoding scheme.

5. The system of claim 1, wherein the visual encoding application includes computer-readable program instructions including instructions for generating a visual code, wherein the visual code encodes an address of the first device chosen from the group consisting of a Bluetooth address, an Internet Protocol (IP) address and a Uniform Resource Locator (URL).

6. The system of claim 1, wherein the visual encoding application includes computer-readable program instructions including instructions for generating a visual code, wherein the visual code encodes a storage location of a predetermined data element chosen from the group consisting of a Uniform Resource Locator (URL), a memory location or a file identifier.

7. The system of claim 1, wherein the visual encoding application includes computer-readable program instructions including instructions for generating a visual code, wherein the visual code has predetermined areas within the visual code for the encoding of the address of the first device and the encoding of the storage location of the predetermined data element.

8. The system of claim 1, wherein the visual encoding application includes computer-readable program instructions including instructions for generating a visual code, wherein the visual code encodes a password.

9. The system of claim 1, wherein the visual encoding application includes computer-readable program instructions including instructions for generating a visual code, wherein the visual code encodes a predetermined communication application.

10. The system of claim 1, wherein the visual encoding application includes computer-readable program instructions including instructions for generating a visual code, wherein the visual code encodes a chosen type of data transfer.

11. The system of claim 1, wherein the visual encoding application includes computer-readable program instructions including instructions for generating a visual code, wherein the configuration of the visual code defines the type of the predetermined data element.

12. The system of claim 1, wherein the second digital device is a mobile device capable of being handheld.

13. The system of claim 1, wherein the second digital device has an internal image capture device.

14. The system of claim 1, wherein the visual decoding application includes computer-readable program instructions including instructions for decoding the captured, visual code, wherein the visual decoding application decodes the type of visual code that is generated by the visual encoding application.

15. The system of claim 1, wherein the visual decoding application includes computer-readable program instructions including instructions for decoding the captured, visual code, wherein, upon decoding the captured visual code, the decoding application automatically initiates a predetermined communication application.

16. A computer program product for establishing short range communication between digital devices, the computer program product comprising a computer readable storage medium having computer-readable program instructions embodied in the medium, the computer-readable program instructions comprising:
   first instructions, implemented on a first digital device, for generating and displaying a visual code that encodes an address of the first digital device and a predetermined data element location identifier identifying a storage location of the predetermined data element within the first digital device; and
   second instructions, implemented on a second digital device, for capturing and decoding the visual code and initiating a short-range communication link between the second digital device and the first digital device for the purpose of transferring the data element from the first digital device to the second digital device.

17. The computer program product of claim 16, wherein the first instructions, implemented on the first digital device, for generating and displaying a visual code further comprises a type of visual code chosen from the group consisting of two-dimensional (2D) barcode, quick response (QR) code, data glyph, and proprietary encoding scheme.

18. The computer program product of claim 16, wherein the first instructions, implemented on the first digital device, for generating and displaying a visual code that encodes the first digital device address, wherein the digital device address is chosen from the group consisting of a Bluetooth address, an Internet Protocol (IP) address and a Uniform Resource Locator (URL).

19. The computer program product of claim 16, wherein the first instructions, implemented on the first digital device, for generating and displaying a visual code that encodes the predetermined data element location identifier, wherein predetermined predetermined data element location identifier is chosen from the group consisting of a Uniform Resource Locator (URL), a memory location or a file identifier.

20. The computer program product of claim 16, wherein the first instructions, implemented on the first digital device, for generating and displaying a visual code further encodes a password.

21. The computer program product of claim 16, wherein the first instructions, implemented on the first digital device, for generating and displaying a visual code further encodes a predetermined communication application.

22. The computer program product of claim 16, wherein the first instructions, implemented on the first digital device, for generating and displaying a visual code further encodes a chosen type of data transfer.

23. A method for establishing short range communication between digital devices, the method comprising the steps of:
    identifying a data element that is associated with a first digital device, the data element requiring transfer to a second digital device;
    encoding, in the form of a visual code, an address of the first digital device and a location identifier of the data element identifying a storage location of the predetermined data element within the first digital device;
    displaying the visual code on a display that is in communication with the first digital device;
    capturing the visual code with an imager that is communication with the second digital device;
    decoding the visual code at the second digital device to determine the location identifier of the data element and the address of the first digital device.

24. The method of claim 23, further comprising the step of initiating a short-range communication link between the second digital device and the first digital device, upon decoding the visual code.

25. The method of claim 24, further comprising the step of confirming, at the first digital device, the authorization of the second digital device, once the short-range communication link has been established.

26. The method of claim 24, further comprising transferring the data element from the first digital device to the second digital device.

27. The method of claim 23, further comprising the step of implementing security means at the second digital device prior to the step of decoding the visual code.

28. The method of claim 23, wherein the step of encoding, in the form of a visual code, an address of the first digital device and a location identifier of the data element further comprises encoding with a visual code chosen form the group consisting of two-dimensional (2D) barcode, quadratic residue (QR) code, data glyph, and proprietary encoding scheme.

29. The method of claim 23, wherein the step of displaying the visual code on a display that is in communication with the first device further comprises displaying the visual code on a display that is internal to the first device.

30. The method of claim 23, further comprising the step of preparing, at the first device, data transmission capabilities for subsequent receipt of data from the second device.

31. A mobile terminal for encoding data elements and visually displaying the code, the terminal comprising:
    a data processor that executes a visual encoding application for generating a visual code, wherein the visual code encodes an address of the mobile terminal and a storage location of a predetermined data element within the mobile terminal; and
    a display in communication with the data processor that receives the generated visual code and displays the visual code.

32. The terminal of claim 31, wherein the type of visual code is chosen from the group consisting of two-dimensional (2D) barcode, quick response (QR) code, data glyph, and proprietary encoding scheme.

33. The terminal of claim 31, wherein the visual code encodes an address of the mobile terminal chosen from the group consisting of a Bluetooth address, an Internet Protocol (IP) address and a Uniform Resource Locator (URL).

34. The terminal of claim 31, wherein the visual code encodes a storage location of a predetermined data element chosen from the group consisting of a Uniform Resource Locator (URL), a memory location or a file identifier.

35. The terminal of claim 31, wherein the visual code encodes a password.

36. The terminal of claim 31, further comprising a transceiver for establishing a wireless short-range communication link for transferring the predetermined data element to a requesting digital device.

37. A mobile terminal configured to establish a short-range wireless communication with a digital device, the terminal comprising:
    an image capture device for capturing a visual code from a display of the digital device;
    a data processor that executes a visual decoding application that is executed by the data processor for decoding the captured visual code to obtain an address of the digital device and a storage location of a predetermined data element within the digital device; and
    a transceiver for establishing a wireless short-range communication link for requesting the predetermined data element from the digital device.

* * * * *